United States Patent
Fukuda et al.

(10) Patent No.: US 8,335,626 B2
(45) Date of Patent: Dec. 18, 2012

(54) APPARATUS FOR CONTROLLING ACCELERATION OF VEHICLE

(75) Inventors: Shotaro Fukuda, Oobu (JP); Yasuhiro Nakai, Kariya (JP); Satoshi Niwa, Nagoya (JP); Hajime Kumabe, Kariya (JP); Motoaki Umakoshi, Oobu (JP); Masayoshi Takeda, Kariya (JP); Yukio Mori, Nagoya (JP)

(73) Assignees: DENSO CORPORATION, Kariya (JP); Advics Co., Ltd., Aichi-pref. (JP)

( * ) Notice: Subject to any disclaimer, the term of this patent is extended or adjusted under 35 U.S.C. 154(b) by 355 days.

(21) Appl. No.: 12/614,627

(22) Filed: Nov. 9, 2009

(65) Prior Publication Data
US 2010/0121549 A1    May 13, 2010

(30) Foreign Application Priority Data
Nov. 10, 2008   (JP) ................ 2008-287738

(51) Int. Cl.
*B60T 8/32* (2006.01)
(52) U.S. Cl. ............ 701/93; 701/70; 701/110; 701/41; 180/170; 180/197
(58) Field of Classification Search ............ 701/93, 701/1, 70, 74, 90, 96, 110; 180/170, 179, 180/197, 233, 248, 415
See application file for complete search history.

(56) References Cited

U.S. PATENT DOCUMENTS
6,418,370 B1   7/2002  Isogai et al.
7,853,390 B2 *  12/2010  Inou et al. .............. 701/93

FOREIGN PATENT DOCUMENTS
| JP | A-2000-108721 | 4/2000 |
| JP | A-2006-506270 | 2/2006 |
| JP | A-2008-030677 | 2/2008 |
| WO | WO 2004/045898 | 6/2004 |

\* cited by examiner

*Primary Examiner* — Thomas Black
*Assistant Examiner* — Luke Huynh
(74) *Attorney, Agent, or Firm* — Posz Law Group, PLC

(57) ABSTRACT

An apparatus is provided for controlling acceleration of a vehicle to a target acceleration. In the apparatus, a target acceleration calculator calculates the target acceleration. A provisional acceleration setting unit sets a provisional target acceleration such that a change rate of the provisional target acceleration is limited to a target limitation value. The provisional target acceleration is used during a step during which the acceleration of the vehicle is changed to the target acceleration. A drive power calculator calculates a drive power to obtain the provisional target acceleration. In the provisional acceleration setting unit, an initial value of the provisional target acceleration depends on a running state of the vehicle.

5 Claims, 11 Drawing Sheets

FIG.3A

● : TARGET ACCELERATION DEMANDED BY SPEED CONTROLLER
○ : TARGET ACCELERATION DEMANDED IN ACCELERATION CONTROLLER
┊ : CALCULATION INTERVALS IN SPEED CONTROLLER
┊ : CALCULATION INTERVALS IN ACCELERATION CONTROLLER

<CONTROL BASED ON ONLY TARGET ACCELERATION>

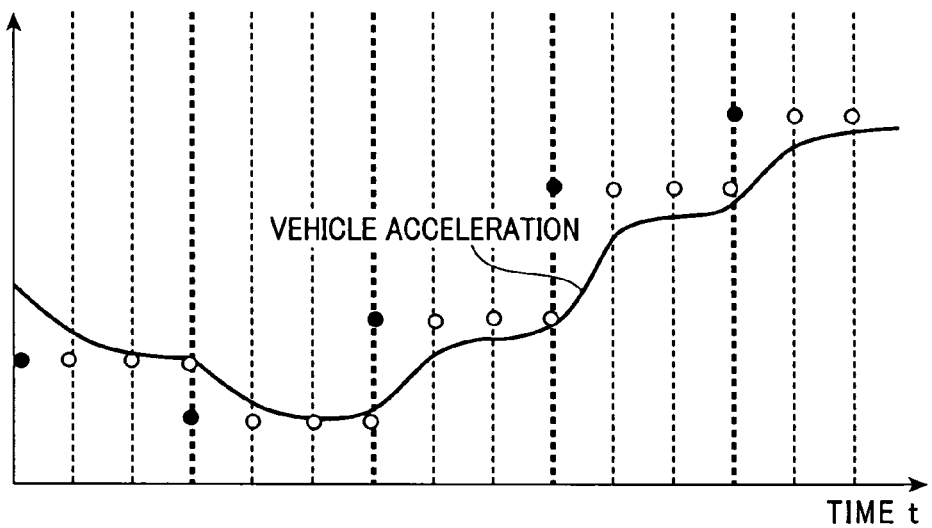

FIG.3B

● : TARGET ACCELERATION DEMANDED BY SPEED CONTROLLER
○ : TARGET ACCELERATION DEMANDED IN ACCELERATION CONTROLLER
┊ : CALCULATION INTERVALS IN SPEED CONTROLLER
┊ : CALCULATION INTERVALS IN ACCELERATION CONTROLLER

<CONTROL USING JERK LIMITATION>

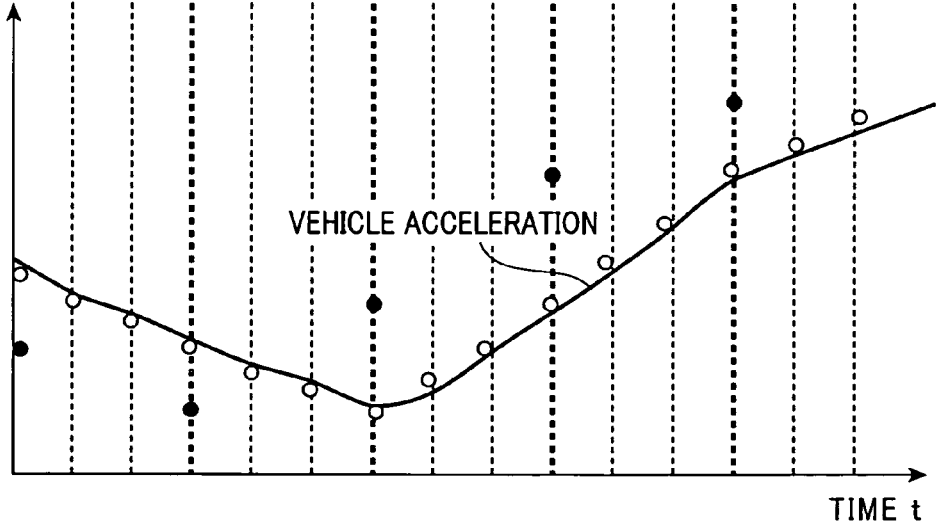

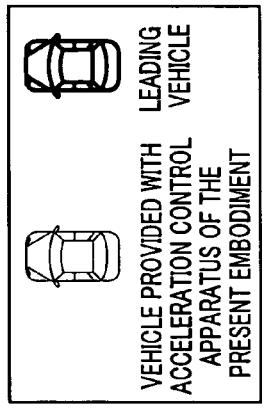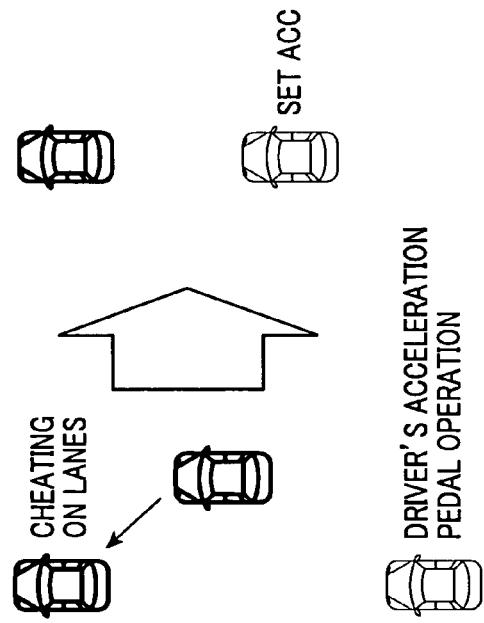
FIG.8B
<SCENARIO 2>
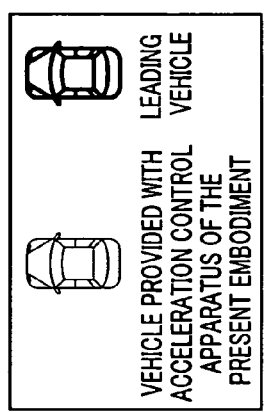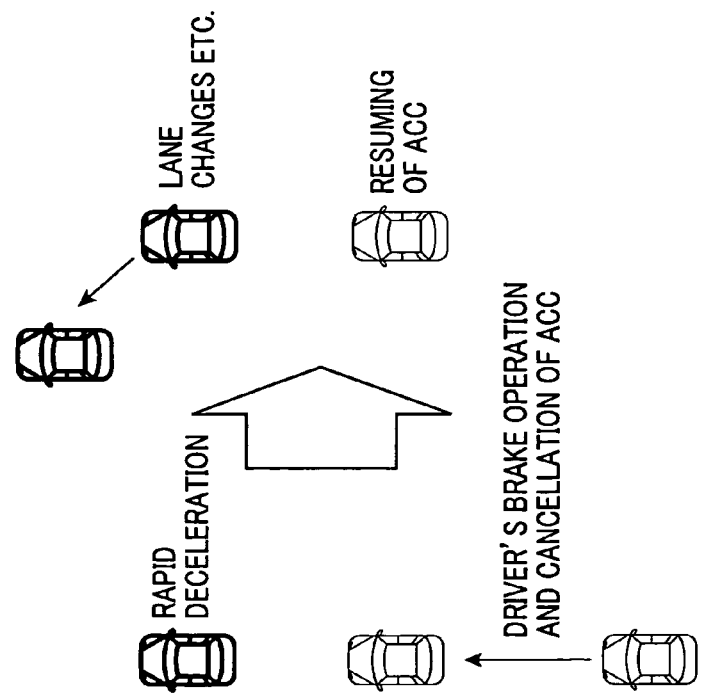
FIG.8A
<SCENARIO 1>

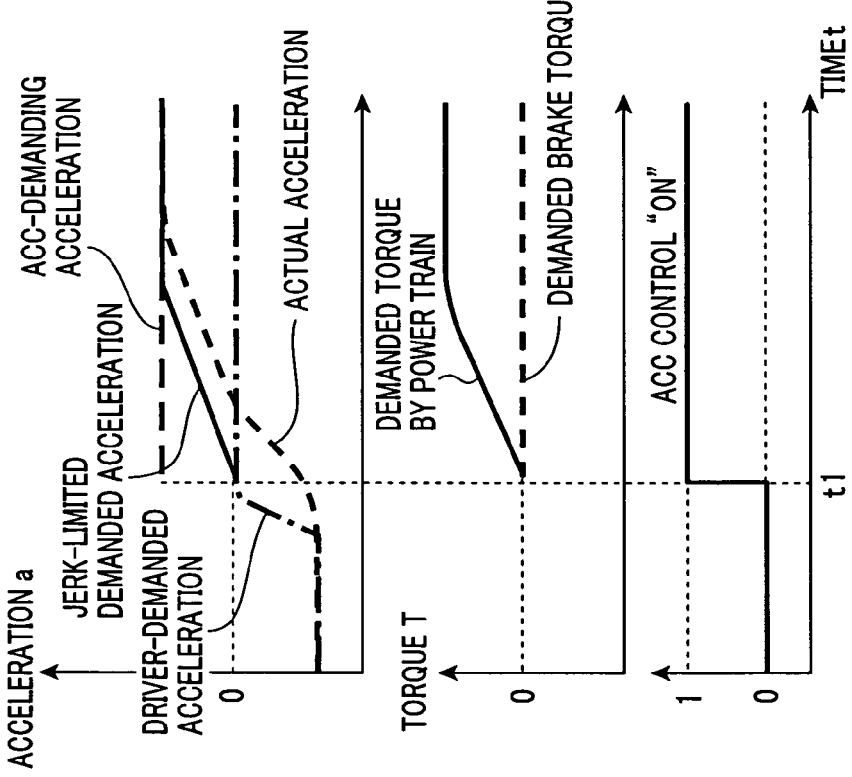
FIG.9B THE PRESENT EMBODIMENT
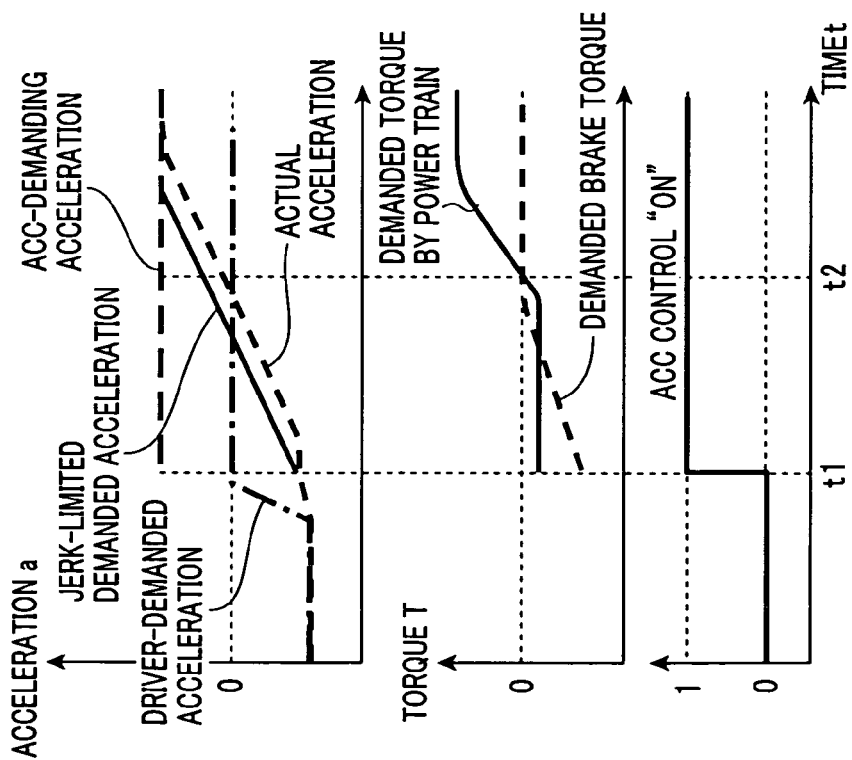
FIG.9A PRIOR ART

THE PRESENT EMBODYMENT

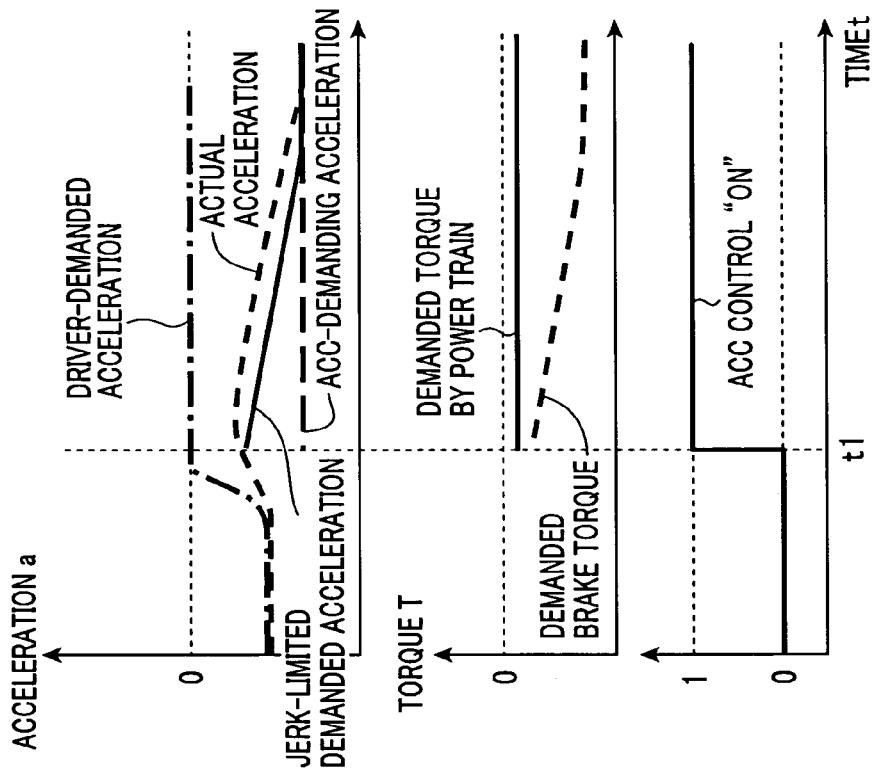
FIG.11B
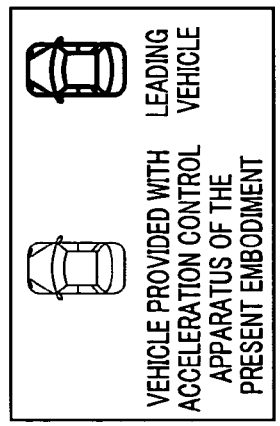
FIG.11A
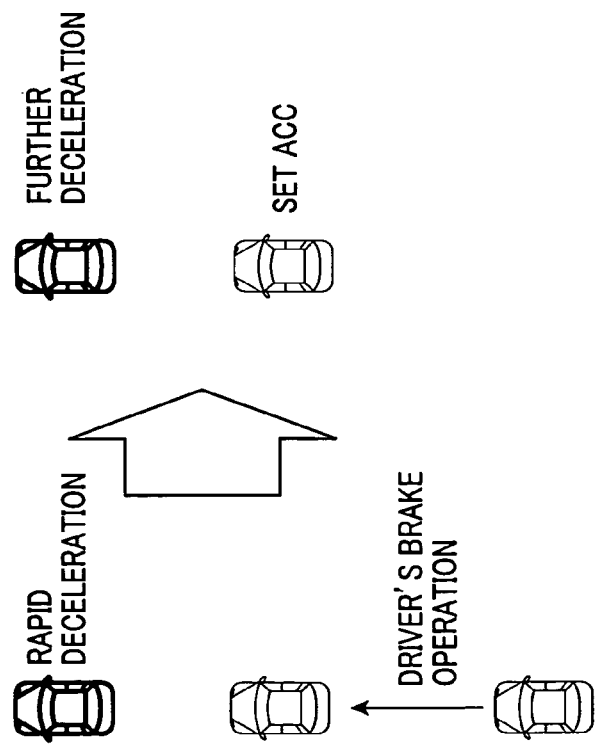

APPARATUS FOR CONTROLLING ACCELERATION OF VEHICLE

CROSS-REFERENCE TO RELATED APPLICATION

This application is based on and claims the benefit of priority from earlier Japanese Patent Application No. 2008-287738 filed on Nov. 10, 2008, the description of which is incorporated herein by reference.

BACKGROUND OF THE INVENTION

1. Technical Field of the Invention

The present invention relates to an apparatus that controls the acceleration of a vehicle at a target value of the acceleration.

2. Related Art

In the field of control of vehicle speeds, various types of control techniques have been known. Such techniques include a technique to automatically control the speed of a vehicle at a desired value based on distances between two vehicles, which is called ACC (adaptive cruise control) and a technique to reduce the speed of a vehicle down to an appropriate value for cornering a curve before entering the curve. These control techniques are disclosed by Japanese Patent Laid-open Publication Nos. 2000-108721 and 2008-30677, respectively.

Another control technique was presented in Fraunhofer ISST workshop COMPARC (Berlin, May 29, 2008). This technique provides, as two individual functional controllers, not only a speed controller which decides a target acceleration for realizing a target speed by deciding it using information indicative of the running state of a preceding vehicle but also an acceleration controller which decides a drive force for realizing the decided target acceleration. According to this technique, it is possible to provide the speed controllers which work irrespective of the characteristics of actuators mounted in vehicles, so that it may be effective for developing an acceleration control apparatus as a whole.

Another acceleration controller, which is similar in configuration to the above workshop-shown acceleration controller, is also shown by Japanese Patent Laid-open Publication No. JP 2006-506270 A, This acceleration controller controls smoothly a vehicle acceleration at a target acceleration value calculated by a speed controller. To realize this smooth control of the acceleration, the acceleration controller is also provided with means to limit a jerk, which is an amount of changes in the acceleration which is an unpleasant motion, so that a sudden change in the acceleration can be avoided. This jerk limiting means is useful in smoothly controlling the vehicle acceleration as long as the acceleration controller controls the acceleration at appropriately designed control intervals, even when the control intervals (i.e., calculation intervals) for the target acceleration are delayed for some reasons in the speed controller.

However, it is pointed out that, in some running states of a vehicle, the delay in the acceleration control, which is due to the jerk limitation control, becomes larger. This results in giving drivers an unpleasant feeling.

SUMMARY OF THE INVENTION

The present invention has been made in view of the foregoing situations, and an object of the present invention is to reduce a delay in controlling the acceleration, which delay is caused depending on running states of a vehicle.

In order to realize the foregoing object, the present invention provides an apparatus for controlling acceleration of a vehicle to a target acceleration value. This apparatus comprises a target acceleration calculator that calculates the target acceleration; a provisional acceleration setting unit that sets a provisional target acceleration such that a change rate of the provisional target acceleration is limited to a target limitation value, the provisional target acceleration being used during a step during which the acceleration of the vehicle is changed to the target acceleration calculated by the target acceleration calculator; and a drive power calculator that calculates a drive power to obtain the provisional target acceleration set s by the provisional acceleration setting unit. The provisional acceleration setting unit includes means for setting an initial value of the provisional target acceleration depending on a running state of the vehicle. Hence, a delay in controlling the acceleration, which is caused in some running states of the vehicle, can be avoided or reduced reliably.

It is preferred that the apparatus further comprises an estimating unit that estimates an acceleration demanded by a driver of the vehicle, wherein the provisional acceleration setting unit is configured to set the initial value of the provisional target acceleration depending on a vehicle acceleration obtained at a timing when controlling the acceleration is started and the demanded acceleration estimated by the estimating unit.

For example, the provisional acceleration setting unit is configured to set the initial value of the provisional target acceleration depending on, of the vehicle acceleration and the demanded acceleration, either one whose difference from the target acceleration is smaller than a difference of the other from the target acceleration. Hence, a delay in controlling the acceleration, which is caused due to starting the acceleration control in vehicle specific running states, can be avoided or reduced reliably.

Further, the foregoing apparatus may comprise a detector that detects that the vehicle starts to travel from a stopped state thereof. In this configuration the provisional acceleration setting unit may be configured to set the initial value of the provisional target acceleration to zero in cases where the detector detects the vehicle starts to travel. Hence, a delay in controlling the acceleration, which is caused in response to making the vehicle start during the acceleration control, can be avoided or reduced effectively.

As a further mode of the present invention, there is provided a program stored in a memory and configured to be readable by a computer, the computer operating based on the program for an apparatus for controlling acceleration of a vehicle to a target acceleration, the program allowing the computer to functionally perform of: a provisional acceleration setting unit that sets a provisional target acceleration such that a change rate of the provisional target acceleration is limited to a target limitation value, the provisional target acceleration being used during a step during which the acceleration of the vehicle is changed to the target acceleration; and a drive power calculator that calculates a drive power to obtain the provisional target acceleration set by the provisional acceleration setting unit, wherein the provisional acceleration setting unit includes means for setting an initial value of the provisional target acceleration depending on a running state of the vehicle.

BRIEF DESCRIPTION OF THE DRAWINGS

In the accompanying drawings;

FIGS. 3A and 3B show graphs for explaining an advantage gained by limiting jerks;

FIGS. 8A and 8B explain examples (scenarios 1 and 2) in which there occurs a delay in controlling the acceleration;

FIGS. 9A and 9B explain an advantage of the acceleration control obtained in the scenario 1, which is gained compared with a conventional technique;

FIG. 11A explains another example (scenario 3) in which a delay occurs in controlling the acceleration;

FIG. 11B is a timing chart explaining an acceleration control performed in the scenario 3 similarly a conventional technique;

DETAILED DESCRIPTION OF THE PREFERRED EMBODIMENTS

Referring to the accompanying drawings, an embodiment of an acceleration control apparatus to which the present invention is applied will now be described.

Figure 1:
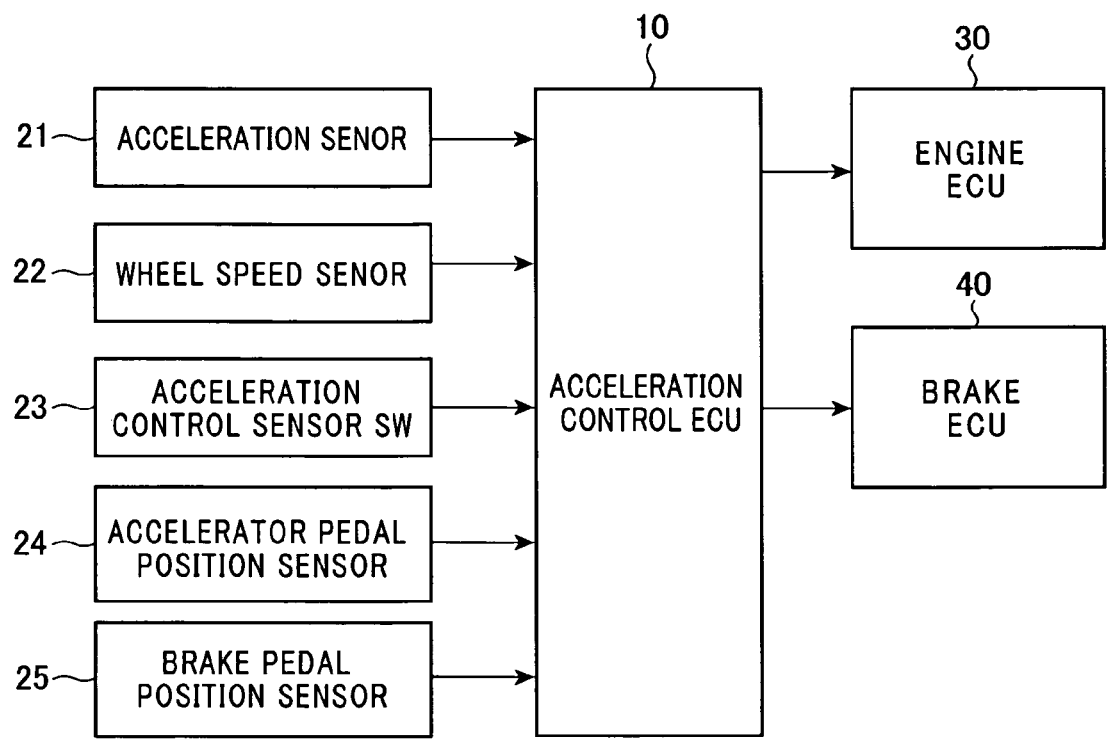
FIG. 1 is a block diagram outlining the configuration of an acceleration control apparatus according to an embodiment of the present invention.

FIG. 1 outlines in block form the configuration of the acceleration control apparatus of the present embodiment.

The acceleration control apparatus, mounted in a vehicle, is provided with an acceleration control ECU (electronic control unit) 10 with a microcomputer system. Practically the acceleration control ECU 10 is provided to electrically connect to an acceleration sensor 21, a wheel speed sensor 22, an acceleration control switch 23, an accelerator pedal position sensor 24 to sense an amount of a driver's depressing operation onto the accelerator pedal, and a brake pedal position sensor 25 to sense an amount of a driver's depressing operation onto the brake pedal, so that the ECU 10 acquires information (output signals) detected by those sensing members.

Of those sensing members, the acceleration sensor 21 is provided to detect acceleration to be caused in the back-and-forth direction of a vehicle. The wheel speed sensor 22 is provided to detect the rotation speed of each wheel of the vehicle and detected rotation speeds are used to compute a vehicle speed and a vehicle acceleration.

The acceleration control switch 23 is manually used by a driver to start and end control of the acceleration. In the present embodiment, the acceleration control is prepared as ACC (adaptive cruise control). The manual operations for starting this acceleration control are an operation to decide a running speed, at which the vehicle runs at present, as a set speed (maximum speed) of the vehicle and an operation to resume the last set speed so that the speed set last time is reset.

The accelerator pedal position sensor 24 and the brake pedal position sensor 25 are provided to detect the amount of depression of the accelerator pedal and the brake pedal, respectively.

The acceleration control ECU 10 receives signals detected and sensed by the sensing means 21 to 25 to calculate axle torque necessary for controlling the vehicle acceleration at a target acceleration which is set. The calculated axle torque is outputted from the acceleration control ECU 10 to an engine (internal combustion engine) ECU 30 and the brake ECU 40. Hence, it is possible that both engine ECU 30 and brake ECU 40 control a drive force and a braking force of the vehicle in response to the axle torque.

Figure 2:
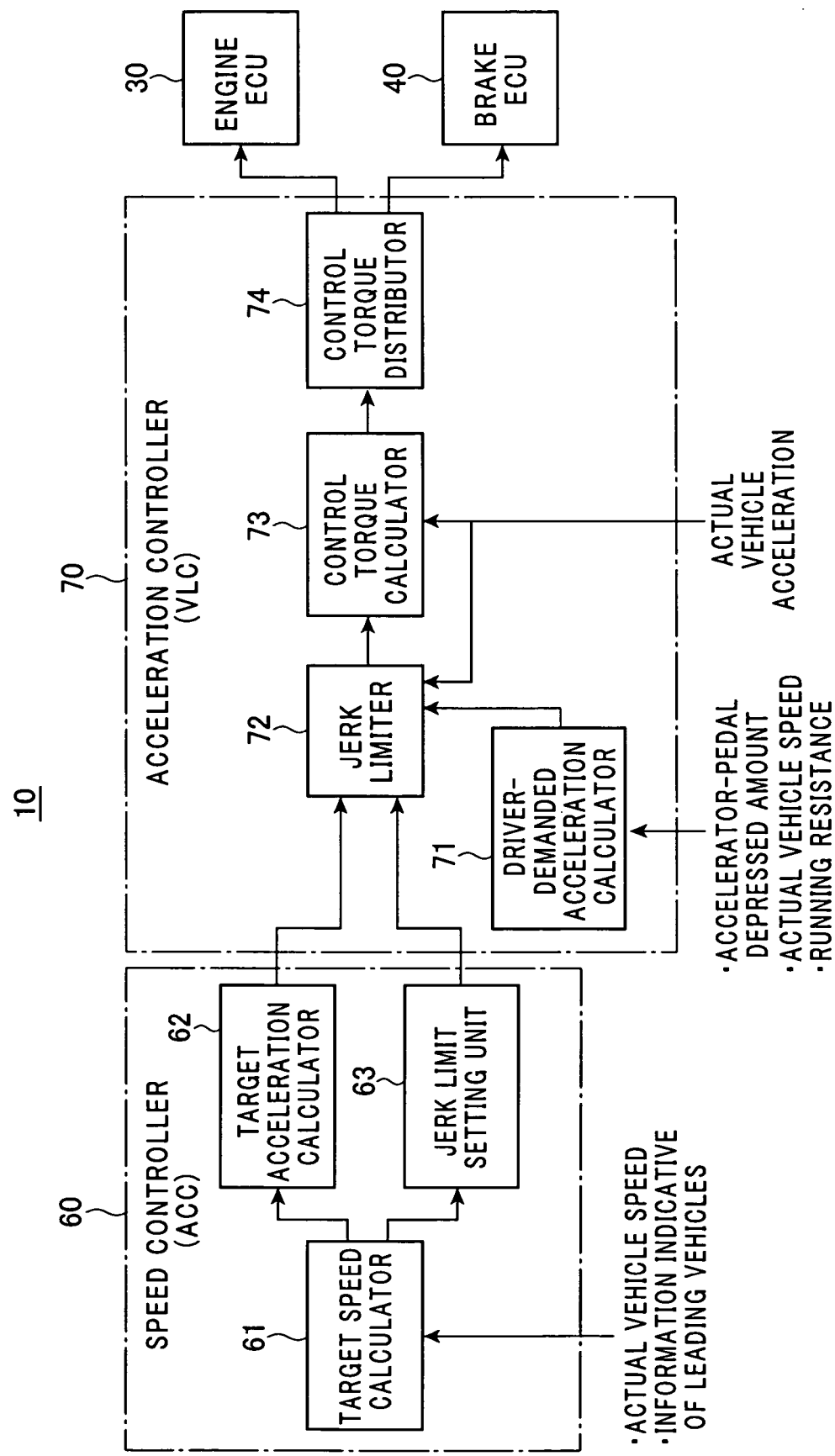
FIG. 2 is a block diagram showing a functional configuration realized by an acceleration control ECU incorporated in the acceleration control apparatus.

Referring to FIG. 2, the processes performed by the acceleration control ECU 10 will now be outlined.

FIG. 2 is a block diagram showing the functions performed by the acceleration control ECU 10, where these functions are realized when this ECU 10 executes an application program previously given.

As shown in FIG. 2, the acceleration control ECU 10 functions as a speed controller 60 for ACC and an acceleration controller 70 for VLC (vehicle longitudinal control), which are respectively realized when mutually independent application programs are activated in the ECU 10, Both controllers 60 and 70 are functionally independent of each other, resulting in that the application program for the speed controller 60 can be designed with no consideration of the characteristics of actuators mounted in each vehicle for controlling the drive and braking forces.

In the present embodiment, both controllers 60 and 70 are functionally realized in the sole acceleration controller 10, but this is not a definitive example, The speed and acceleration controllers 60 and 70 may be provided by two ECUs physically separated. Alternatively, the controllers 60 and 70 may be functionally incorporated in the engine ECU 30, brake ECU 40, and/or other ECUs.

The speed controller 60 functionally provides a target speed calculator 61 and a target acceleration calculator 62, and a jerk limit setting unit 63.

Of these components, the target speed calculator 61 receives information indicative of the speed of a vehicle (actual vehicle speed) detected by the wheel speed sensor 22 and information indicative of preceding other vehicles. Based on the received information, this calculator 61 calculates a target speed at given control intervals (i.e., given calculation intervals), and provides the target acceleration calculator 62 and the jerk limit setting unit 63 with data indicating the calculated target speed.

Using the target speed provided from the target speed calculator 61, the target acceleration calculator 62 calculates, at control intervals corresponding to that in the target speed calculator 61, a target acceleration necessary for controlling the vehicle speed at the target speed. Data indicating the calculated target acceleration is then sent to the acceleration controller 70.

Meanwhile, the jerk limit setting unit 63 uses the target speed to calculate and set a jerk limit, which is a target value (target limitation value) to limit a rate of change in the target acceleration. Data indicating the set jerk limit is also sent to the acceleration controller 70. Practically, in the jerk limit setting unit 63, the jerk limit is calculated and set as two jerk limits for increasing and decreasing the acceleration, and given to the acceleration controller 70.

As shown in FIG. 2, the acceleration controller 70 functionally provides a driver-demanded acceleration calculator 71, a jerk limiter 72, a control torque calculator 73, and a control torque distributor 74.

The driver-demanded acceleration calculator 71 receives data showing various values, such as amounts of driver's depression detected by the accelerator pedal position sensor 24 and the brake pedal position sensor 25, an actual vehicle speed, and a vehicle running resistance, and estimates an acceleration demanded by the driver using such data. This demanded acceleration is referred to as a "driver-demanded acceleration (or driver-requested acceleration)" in the present embodiment. Data indicative of this calculated driver-demanded acceleration is sent to the jerk limiter 72, How to calculate this acceleration will be explained later.

Using the data indicative of the target acceleration and the jerk limit from the speed controller 60 and the data indicative of the driver-demanded acceleration from the driver-demanded acceleration calculator 71, the jerk limiter 72 sets, at given control intervals, a provisional target acceleration to be targeted at present. In the following description, to distinguish the target acceleration from the speed controller 60 (i.e., the target acceleration calculator) from the target acceleration from the jerk limiter 72, the former is called "ACC-demanding acceleration (or ACC-requesting acceleration)" and the later is called "jerk-limited demanded acceleration".

To be specific, the jerk-limited demanded acceleration is a target acceleration to be set provisionally during a step during which the vehicle acceleration is changed to the ACC-demanding acceleration. The jerk-limited demanded acceleration is set so that a rate of changes in the jerk-limited demanded acceleration is limited to a jerk limit. That is, the jerk-limited demanded acceleration is set to have the ACC-demanding acceleration as a target value to be realized (a maximum value or a minimum value).

The jerk limiter 72 operates at control cycles which are shorter than control cycles of the target speed and acceleration calculators 61 and 62. Hence, per a single value of the ACC-demanding acceleration outputted from the target acceleration calculator 62, the value of the jerk-limited demanded acceleration is set a plurality of times. Date showing the set jerk-limited demanded acceleration is sent to the control torque calculator 73.

Using the jerk-limited demanded acceleration, the control torque calculator 73 calculates a target axle torque for realizing the jerk-limited demanded acceleration. Data of this target axle torque is sent to the control torque distributor 74.

The control torque distributor 74 receives the data of the target axle torque to distribute it to data for the engine ECU 30 functioning as drive torque realizing means and the brake ECU 40 functioning as brake torque realizing means.

Referring to FIG. 3, advantages obtained when the jerk is limited will now be described.

It is assumed that a vehicle has a first-order delay type of response characteristic. In this case, when only the target acceleration (i.e., ACC-demanding acceleration) is controlled without jerk limitation even though the control intervals (i.e., calculation intervals) of the speed controller 60 are longer, the driver feels sudden jerks during acceleration of the vehicle, as shown by an upper graph in FIG. 3.

In contrast, when the jerk limitation is parallel to the acceleration control, the acceleration controller 70 can set finely the target acceleration (i.e., the jerk-limited demanded acceleration) at respective control timings decided by its control intervals, even when the speed controller 60 has longer control cycles. Thus, as shown by a lower graph in FIG. 3, the vehicle acceleration can be controlled smoothly.

Namely, when the speed controller 60 provides the acceleration controller 70 with not only the ACC-demanding acceleration but also a desired jerk limit depending on such factors as vehicle running conditions, the speed controller 60 is able to control the vehicle acceleration smoothly without shortening its control intervals.

How the driver-demanded acceleration calculator 71 works will now be described.

Figure 4:
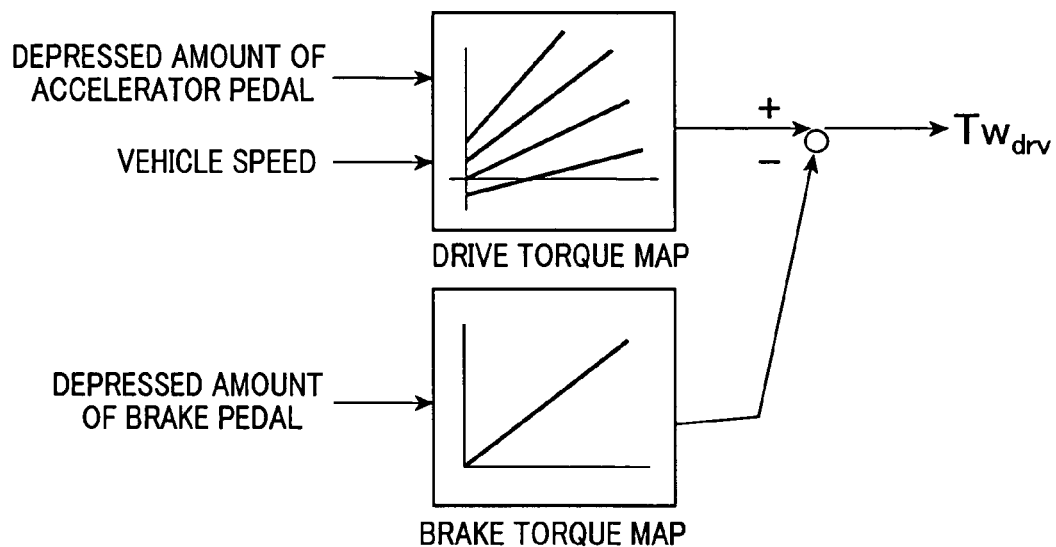
FIG. 4 is a block diagram for explaining how to calculate an axle torque demanded by a driver's operation.

This controller 71, as shown in FIG. 4, has a drive torque map to calculate a drive torque and a brake torque map to calculate a brake torque. Practically, the controller 71 gives this drive torque map both a driver's depressing amount of the accelerator pedal, detected by the accelerator pedal position sensor 24, and a vehicle actual speed, so that the drive torque map yields a corresponding drive torque. In addition, the driver-demanded acceleration calculator 71 gives the brake torque map a driver's depressing amount of the brake pedal, which is detected by the brake pedal position sensor 25, so that the brake torque map yields a corresponding brake torque.

The drive torque map is stored in the form of two-dimensional data in a memory so as to define a relationship between a depressed amount of the accelerator pedal (in the lateral axis) and a drive torque being generated (estimate values: in the vertical axis) for each of a plurality of vehicle velocities. Meanwhile the brake torque map is stored in the form of two-dimensional data in a memory so as to define a relationship between a depressed amount of the brake pedal (in the lateral axis) and a brake torque being generated (estimate values; in the vertical axis).

The driver-demanded acceleration calculator 71 deducts the brake torque from the drive torque, producing a driver's demanding axle torque $Tw_{drv}$. Then, the controller 71 calculates the following formula (1) to obtain a driver-demanded acceleration $a_{drv}$;

$$a_{drv}=(Tw_{drv}/r \cdot M)-[\{(\rho \cdot CD \cdot S \cdot V^2)/(2M)\}+\mu \cdot g+(a_s-a_w)] \quad (1),$$

wherein r represents the diameter (m) of each tire, M represents the weight (kg) of a vehicle, $\rho$ is an air density (kg/m$^3$), CD is an air resistance coefficient, S represents a frontal projected area (m$^2$) of the vehicle, V represents a vehicle speed (m/s), $\mu$ is a coefficient of rolling friction, and g is the acceleration of gravity. Further, $a_s$ represents acceleration (m/s$^2$) (including the gravity component) detected by the acceleration sensor 21 and $a_w$ represents a differential value of a wheel speed (m/s$^2$) (which does not include the gravity component) detected by the wheel speed sensor 22.

In the formula (1), "$(\rho \cdot CD \cdot S \cdot V^2)/(2M)$" means a conversion of the air resistance into acceleration, "$\mu \cdot g$" means a conversion of the rolling resistance into acceleration, and "$a_s-a_w$" means a conversion of gradient resistance into acceleration.

Figure 5:
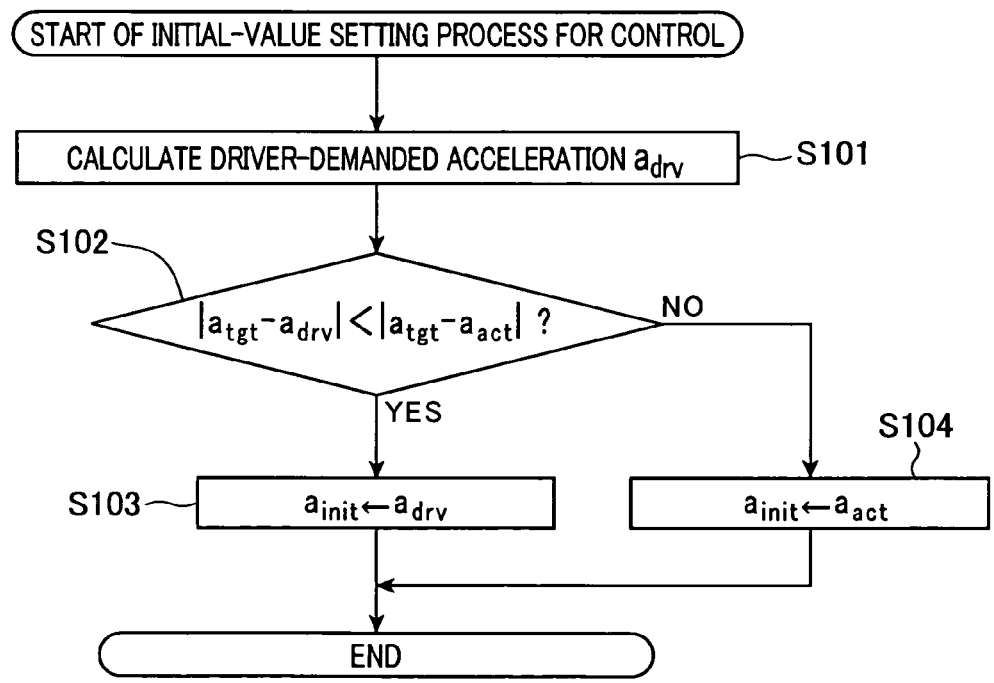
FIG. 5 is a flowchart for setting an initial value of an acceleration needed when the control is started.
Figure 6:
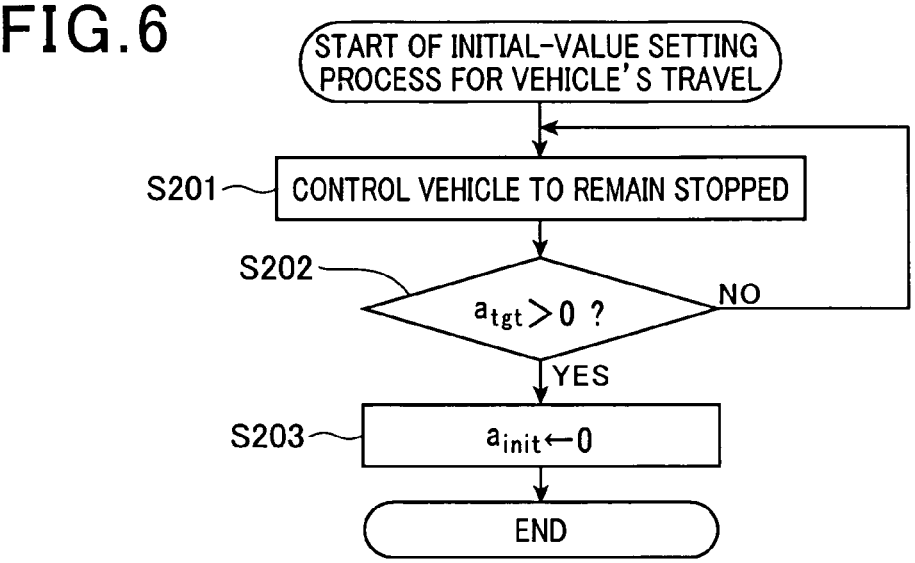
FIG. 6 to is a flowchart for setting an initial value of the acceleration needed when the vehicle is started.
Figure 7:
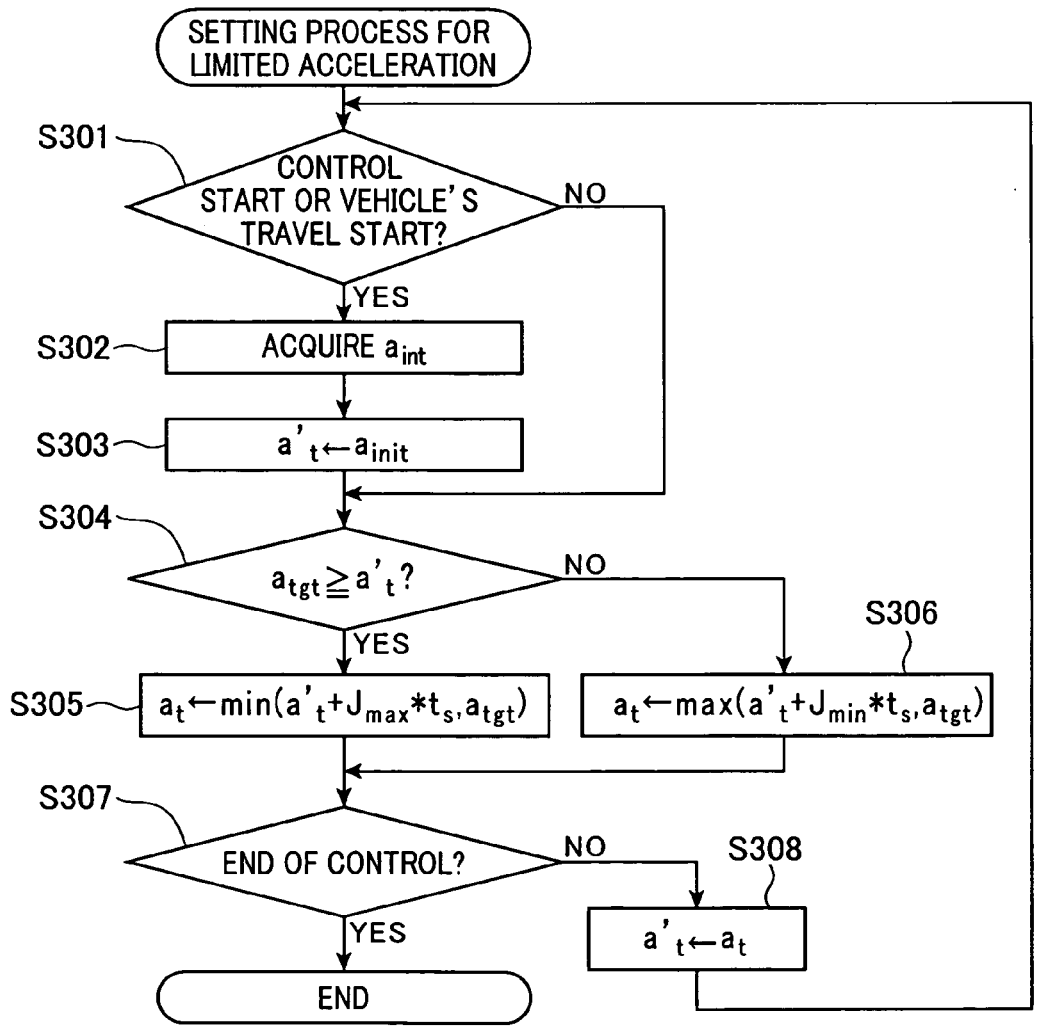
FIG. 7 is a flowchart for setting a limited acceleration.

Next, with reference to FIGS. 5-7, the process performed by the acceleration control ECU 10 will now be detailed.

First, a flowchart shown in FIG. 5 will now be described, where there is provided an initial-value setting process being performed when the acceleration control ECU 10 starts controlling the acceleration.

When the initial-value setting process is activated, this ECU 10 proceeds to step S101 to calculate a driver-demanded acceleration $a_{drv}$. This step S101 functionally realizes the driver-demanded acceleration calculator 71.

The processing proceeds to step S102, where it is determined by the ECU 10 whether or not a difference $|a_{tgt}-a_{drv}|$ between an ACC-demanding acceleration $a_{tgt}$ and the driver-demanded acceleration $a_{drv}$ (i.e., a driver-demanded acceleration when the acceleration control is just started) is smaller than a difference $|a_{tgt}-a_{act}|$ between the ACC-demanding acceleration $a_{tgt}$ and a vehicle acceleration $a_{act}$ (i.e., an actual acceleration when the acceleration control is started) which is obtained based on the signal from the wheel speed sensor 22.

When the determination show that $|a_{tgt}-a_{drv}|<|a_{tgt}-a_{act}|$ is realized (YES at step S102), the ECU 10 proceeds to step S103, where an initial value $a_{init}$ of the jerk-limited demanded value is set to the current driver-demanded acceleration $a_{drv}$. The initial-value setting process is then ended.

On the other hand, when the determination at step S102 shows $|a_{tgt}-a_{drv}|\geq|a_{tgt}-a_{act}|$, the process proceeds to step S104. In this step S104, the initial value $a_{init}$ of the jerk-limited demanded value is set to the current actual acceleration $a_{act}$, ending the initial-value setting process.

Accordingly, through the initial-value setting process for the control start, the initial value $a_{init}$ for the jerk-limited demanded value is set to whichever of the driver-demanded acceleration $a_{drv}$ and the actual acceleration $a_{act}$, of which difference from the ACC-demanding acceleration $a_{tgt}$ is smaller than that of the other.

Next a flowchart shown in FIG. 6 is made reference to detail a process for setting the initial value $a_{init}$, which is performed in a condition where the acceleration control ECU 10 is under control of the acceleration but the vehicle is stopped.

When this initial value setting process for the vehicle's travel start is started, a step S201 is launched first, where control for making the vehicle's stopped state remain is performed. Practically, the ACC-demanding acceleration is kept at its negative value, resulting in that the vehicle is subjected to a braking condition similar to a state where the brake pedal is depressed by the driver.

The process proceeds to step S202, where it is determined by the ECU 10 whether or not the ACC-demanding acceleration $a_{tgt}$ so becomes larger than 0. An ACC-demanding acceleration $a_{tgt}$ larger than 0 implies that the vehicle has been made to change from its stopped state to a state ready for start.

When the determination at step S202 is NO, that is, it shows that the ACC-demanding acceleration $a_{tgt}$ is not larger than zero, the process is made to return to step S201. Hence, as long as the ACC-demanding acceleration $a_{tgt}$ is smaller larger than zero, the stop keeping control at step S201 is continued.

However, the determination at step S202 is YES, i.e., $a_{tgt} \geq 0$, the process proceeds to step 203, where the ECU 10 gives 0 to the initial value $a_{init}$ of the jerk-limited demanded acceleration. This process is then ended.

In this way, by the initial value setting process for the vehicle's travel start, the initial value $a_{int}$ of the jerk-limited demanded acceleration for the vehicle's travel start is set to 0 in cases where the acceleration control is performed.

Moreover FIG. 7 is made reference, where there is provided a flowchart performed by the acceleration control ECU 10. This flowchart explains a limited acceleration setting process for calculate the jerk-limited demanded acceleration at intervals (i.e., at given control intervals). This limited acceleration setting process is performed when the acceleration control is started.

When the limited acceleration setting process is commanded, the acceleration control ECU 10 starts a step S301 to determine whether or not it is now time for the acceleration control to start or the vehicle's travel to start.

When it is determined that the determination is YES, i.e., it is time for the acceleration control start or the vehicle's travel start, the process proceeds to step S302 to obtain the initial value $a_{int}$ of the jerk-limited demanded acceleration. This initial value $a_{int}$ which is obtained here is either a value which is set through the initial setting process shown in FIG. 5 when the acceleration control is started or a value which is set through the initial setting process shown in FIG. 6 when the vehicle is started.

The process then proceeds to step S303, where the initial value $a_{int}$ of the jerk-limited demanded acceleration, which is obtained at step S302, is assigned to a value (variable) $a'_t$ for the jerk-limited demanded acceleration $a_t$. The value $a'_t$ is calculated at the latest timing which is decided according to the given calculation intervals. As will be described, in the limited acceleration setting process, the current jerk-limited demanded acceleration $a_t$ is calculated based on the latest calculated value $a'_t$, so that the acceleration $a_t$ is updated. In comply with this, the initial value $a_{int}$ is substituted into the value $a'_t$ at step S303 as well. The process then proceeds to step S303.

Meanwhile the step S301 reveals that it is not the time for acceleration control start or the vehicle's travel start, the process is skipped to step S304 without performing anything.

At step S304, it is determined whether or not the ACC-demanding acceleration $a_{tgt}$ is equal to or larger than the latest value $a'_t$ of the jerk-limited demanded acceleration $a_t$.

In cases where the determination at step S304 is YES, i.e., $a_{tgt} \geq a'_t$, the process proceeds to step S305 to calculate the jerk-limited demanded acceleration at the current calculation timing based on the following formula (2):

$$a_t = \min(a'_t + J_{max} \cdot t_s, a_{tgt}) \qquad (2),$$

wherein $J_{max}$ represents a limitation jerk (a positive limitation value) for acceleration increase and $t_s$ represents an duration between control intervals given in the jerk limiter 72. The process then proceeds to step S307.

On the other hand, for the negative determination (NO) at step S304, that is, $a_{tgt} < a'_t$, the process proceeds to step S306, where the jerk-limited demanded acceleration $a_t$ at the current calculation timing is calculated based on the following formula (3):

$$a_t = \max(a'_t - J_{min} \cdot t_s, a_{tgt}) \qquad (3),$$

wherein $J_{min}$ represents a limitation jerk (a negative limitation value) for acceleration decrease. The process is then passed to step S307.

It is determined at step S307 whether or not the current acceleration control has been ended.

When the determination at step S307 is NO, i.e., the acceleration control has not been ended, the next step S308 is processed, wherein the acceleration $a'_t$ at the last calculation timing is updated by substituting the current jerk-limited demanded acceleration $a_t$ into the last one $a'_t$. After this the process is made to return to step S301. Therefore, during the acceleration control, the jerk-limited demanded acceleration $a_t$ is repetitively calculated at given calculation intervals corresponding to the foregoing control intervals given in the jerk limiter 72.

If the determination at step S307 shows the end of the acceleration control, the limited acceleration setting process, which is currently conducted, is ended.

The acceleration control apparatus according to the present embodiment provides various advantages which include the following.

A first advantage is to reduce a delay in the acceleration control, which is caused when the acceleration control is started in a vehicle's particular running state. The reason for the delay reduction is that, of the actual vehicle acceleration and the driver-demanded acceleration which are obtained at a timing when the acceleration control starts, the one for which the difference from the ACC-demanding acceleration is smaller than that of the other, is set as an initial value to the jerk-limited demanded acceleration.

This advantage can be explained with a scenario 1 shown in FIG. 8A. This scenario 1 illustrates a situation where, immediately after completion of a decelerating operation (in which the actual vehicle acceleration becomes lower than the driver-demanded acceleration), the acceleration control is started at an ACC-demanding acceleration which is larger than the driver-demanded acceleration.

Practically, during running of the vehicle following a leading vehicle using the ACC mode, the leading vehicle may rapidly decrease its speed. In such a case, the driver who feels the deceleration is insufficient depresses the brake pedal to gain a larger deceleration. In this situation, the ACC mode is usually interrupted in response to the driver's depression of the brake pedal. When the leading vehicle disappears, during the deceleration, from the lane on which the vehicle now runs, due to lane changes or right/left turns, the driver may resume the ACC mode by stopping depressing the brake pedal for re-acceleration and performing a given resuming operation.

In such a case, if the conventional control (for example, disclosed by Japanese Patent Laid-open Publication No. 2008-30677) is applied, a jerk is limited using, as an initial value of the jerk-limited demanded acceleration, the actual vehicle acceleration acquired at the start timing of the acceleration control for ACC, as shown in FIG. 9A. In this timing chart, if the acceleration control is not started, the actual vehicle acceleration should increase rapidly up to the driver-demanded is acceleration. However, in effect, the jerk limitation caused due to starting the acceleration control delays the increase, taking a longer time in increasing up to the driver-demanded acceleration. Namely, while the ACC-demanding acceleration requires an acceleration of the vehicle, there occurs an unnecessary deceleration for a period of time from a time instant t1 to a time instant t2. This kind of jerk limitation results in a delay in increasing the actual vehicle acceleration up to the driver-demanded acceleration, which is not a driver's intention.

In FIG. 9A (and other similar figures), a graph showing changes in torque T has a longitudinal axis whose positive values represents a drive torque in the forward travel direction and whose negative values represents a brake torque in the forward travel direction. As to demands for performing the ACC, "0" represents a stop of the ACC, while "1" represents that the ACC is demanded.

In contrast, as shown in FIG. 9B, the acceleration is controlled differently from that of the conventional in the acceleration control apparatus according to the present embodiment. That is, in the present embodiment, of an actual vehicle acceleration and a driver-demanded acceleration which are acquired at a timing when the acceleration control is started, the one whose difference from the ACC-demanding acceleration is smaller than that of the other is set as the initial value of the jerk-limited demanded acceleration. Hence, when applied in the scenario 1 described before, the initial value is set to a driver-demanded acceleration given at that time, so that the actual vehicle acceleration can be quickly increased up to the driver-demanded acceleration without interference with the jerk-limited demanded acceleration.

Another example is shown by a scenario 2 in FIG. 8B. In this case, immediately after completion of an accelerating operation (in which the actual vehicle acceleration becomes larger than the driver-demanded acceleration), the acceleration control is started at an ACC-demanding acceleration lower than a current driver-demanded acceleration.

For example, it is assumed that, while the driver is depressing the accelerator pedal for acceleration, another vehicle comes in from an adjacent lane so as to be located just before the vehicle. In such a case, the driver often stops from depressing the accelerator pedal and sets the ACC mode, so that the ACC is activated to take over as means for deceleration to prevent an approach to the leading vehicle.

Figure 10B:
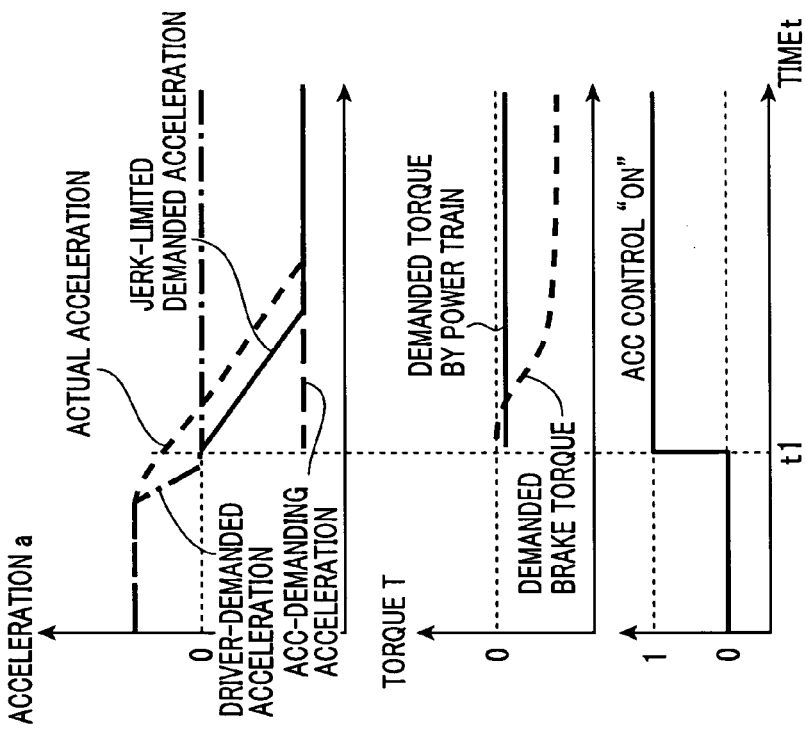
FIGS. 10A and 10B explain an advantage of the acceleration control obtained in the scenario 2, which is gained compared with a conventional technique.
Figure 10A:
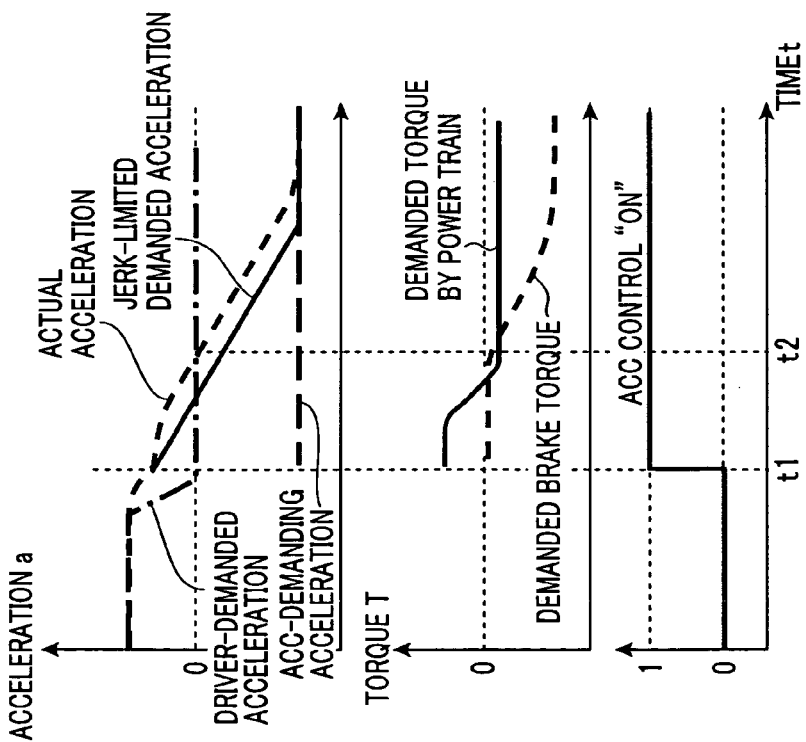

In this example, when the conventional technique based on for example Japanese Patent Laid-open Publication No. 2008-30677 is employed, the acceleration control can be exemplified by FIG. 10A. That is, a jerk limitation is performed using, as an initial value of the jerk-limited demanded acceleration, an actual vehicle acceleration acquired at a timing when the acceleration control is started. If the acceleration control is not started, the actual vehicle acceleration should decreases rapidly down to the driver-demanded acceleration. However, in effect, the jerk limitation caused due to starting the acceleration control delays the decrease, taking a longer time in decreasing down to the driver-demanded acceleration. Namely, while the ACC-demanding acceleration requires deceleration of the vehicle, there occurs an unnecessary acceleration for a period of time from a time instant t1 to a time instant t2. This kind of jerk limitation results in a delay in decreasing the actual vehicle acceleration down to the driver-demanded acceleration, which is not a driver's intention as well.

In contrast, as is the case for increasing the acceleration, the acceleration control apparatus according to the present embodiment controls the acceleration differently from that of the conventional. That is, of an actual vehicle acceleration and a driver-demanded acceleration which are acquired at a timing when the acceleration control is started, either one whose difference from the ACC-demanding acceleration is smaller than that of the other is set as the initial value of the jerk-limited demanded acceleration. Hence, when applied in the scenario 2 described before, the initial value is set to a driver-demanded acceleration given at that time, so that the actual vehicle acceleration can be quickly decreased down to the driver-demanded acceleration without interference with the jerk-limited demanded acceleration.

As illustrated in FIG. 11A, there is provided a third scenario 3, which is an example in which, immediately after completion of a decelerating operation (in which the actual vehicle deceleration becomes lower than the driver-demanded acceleration), the acceleration control is started at an ACC-demanding acceleration lower than the actual vehicle acceleration.

For example, a driver depresses the brake pedal for deceleration and tries to approach to a leading vehicle. After this, the driver stops to depress the brake pedal to follow the leading vehicle and, in parallel, sets the ACC mode, but the leading vehicle immediately decelerates again. This is one case which can be illustrated by FIG. 11.

In this example, as shown in FIG. 11B, the acceleration control can be performed based on either the conventional technique or the technique according to the present embodiment. That is, the initial value of the jerk-limited demanded acceleration is set to an actual vehicle acceleration acquired at a time when the acceleration control is started, and the jerks are limited using that initial value.

The present embodiment provides another advantage which is also related to improving a delay in controlling the vehicle acceleration. In cases where the vehicle travel start is detected when the acceleration control is operating, the initial value of the jerk-limited demanded acceleration is set to 0.

Hence, during the acceleration control, it is possible to suppress the delay in controlling the acceleration which is caused when the vehicle travel is started.

Figure 12A:
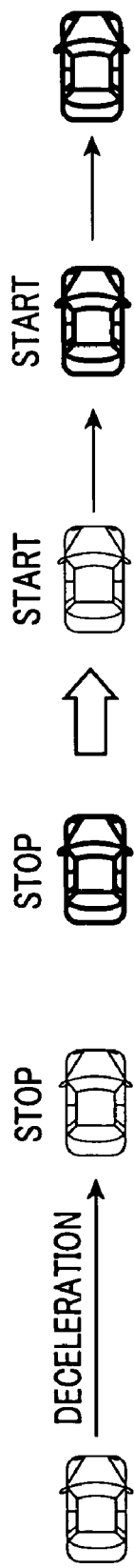
FIGS. 12A, 12B and 12C explain an advantage of the acceleration control gained when the vehicle is started during the acceleration control.

Such an advantage can be enjoyed in a situation where as shown in FIG. 12A, during the acceleration control, the vehicle stops from traveling in response to a travel stop of the leading vehicle, and re-starts to travel in response to a re-start of the leading vehicle.

Figure 12B:
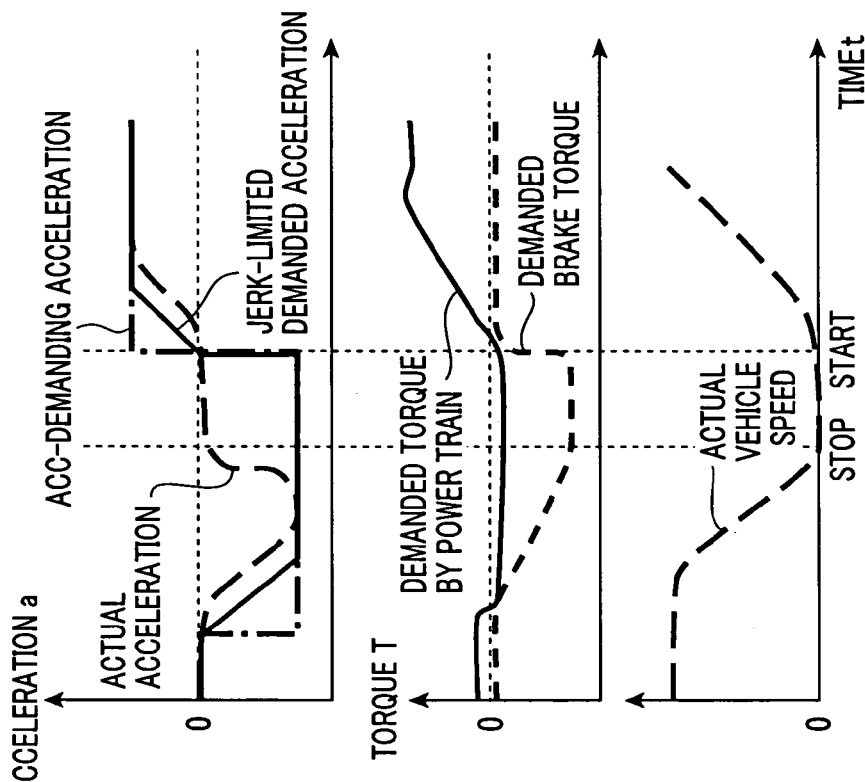

In this situation, as shown in FIG. 12B, the conventional acceleration control can be applied. However, in that case, there is a drawback that an unpleasant feeling will be given to the driver, due to the fact that a delay in the vehicle travel start results in a driver's undesired delay in following a leading vehicle. The delay is attributable to the jerk limitation. When the ACC-demanding acceleration is below zero in response to a deceleration demand in the vehicle's stopped state during the acceleration control, the jerk limitation becomes effective using the current ACC-demanding acceleration when the vehicle starts to travel. It thus takes a time until the ACC-demanding acceleration becomes over zero, thereby leading to the delay. This kind of jerk limitation prevents the vehicle to start to travel quickly, thus being unwanted by the driver.

Figure 12C:
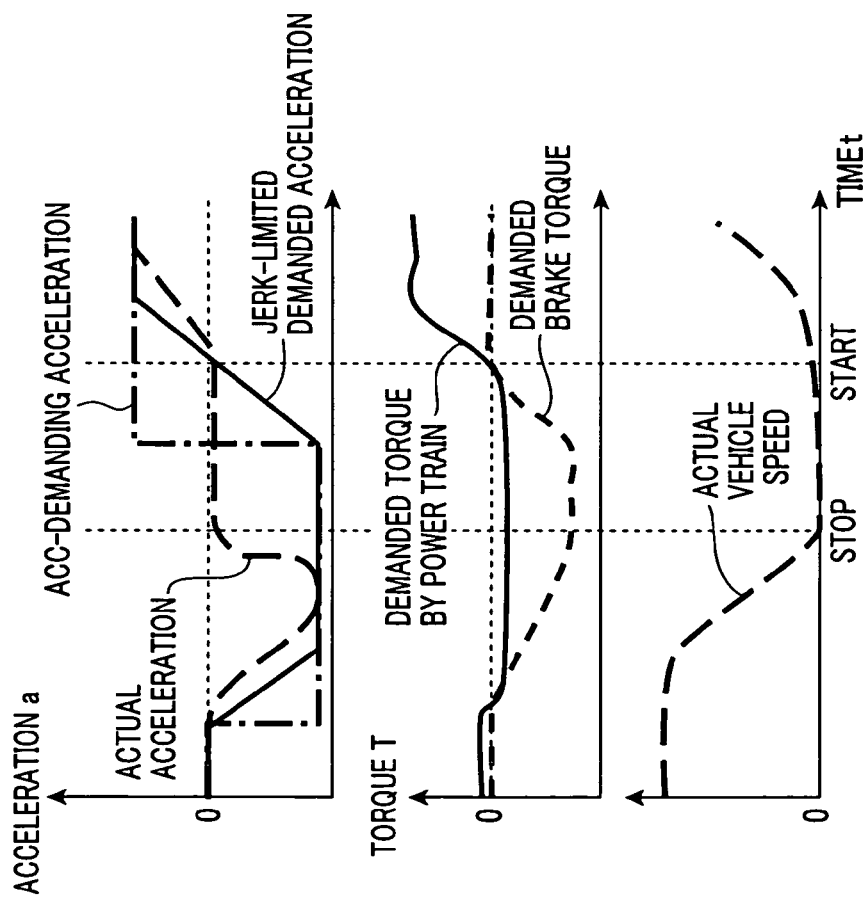

In contrast, the acceleration control performed in the acceleration control apparatus according to the present embodiment can be shown in FIG. 12C. In cases where the vehicle travel start is detected (that is, in cases the acceleration controller 70 receives an acceleration demand (i.e., a positive ACC-demanding acceleration) in a vehicle speed of 0, the initial value of the jerk-limited demanded acceleration is set to zero. In this way, setting the initial value to zero when the vehicle starts to travel makes it possible to make the vehicle start in a smooth and speedy manner, without a driver's unwanted delay in the vehicle travel start.

In the acceleration control apparatus of the present embodiment, the target acceleration calculator 62 is provided as a target acceleration calculator, and the jerk limiter 72 (i.e., steps S102-S104, S203, S301-S307 performed by the acceleration control ECU 10) is provided as a provisional acceleration setting unit. The control torque calculator 73 is provided as a drive power calculator, the driver-demanded acceleration calculator 71 (i.e., step S101 performed by the acceleration control ECU 10) is provided as an estimation unit for a demanded calculation, and step S202 performed by the acceleration control ECU 10 realizes a detector that detects a vehicle's travel start.

(Modifications)

The foregoing embodiment can be modified into other forms in comply with the gist of the present invention.

In the forgoing embodiment, the acceleration control is applied to the ACC (adaptive cruise control), but this acceleration control can be, of course, other forms of the acceleration control, which include control to decelerate an vehicle down to a speed proper for running a curve, before entering the curve.

The control intervals for the jerk-limited demanded acceleration may be the same as those of both the target speed calculator 61 and the target acceleration calculator 62.

The present invention may be embodied in several other forms without departing from the spirit thereof. The embodiment and modification described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for controlling acceleration of a vehicle, comprising:
    a target acceleration calculator that calculates a target acceleration for the vehicle;
    a provisional acceleration setting section that sets a provisional target acceleration such that a change rate of the provisional target acceleration is limited to a target limitation value, the provisional target acceleration being used during a step during which the acceleration of the vehicle is changed to the calculated target acceleration;
    a drive power calculator that calculates a drive power to obtain the provisional target acceleration set by the provisional acceleration setting section; and
    an estimating section that estimates an acceleration demanded by a driver in the vehicle,
    wherein the provisional acceleration setting section is configured to set an initial value of the provisional target acceleration depending on either one selected from a vehicle acceleration and the estimated demanded acceleration, the selected acceleration having a difference from the target acceleration, the difference of the selected acceleration being smaller than a difference of the other from the target acceleration, the vehicle acceleration being obtained at a timing when controlling the acceleration is started.

2. The apparatus of claim 1, comprising a detector that detects that the vehicle starts to travel from a stopped state thereof;
    the provisional acceleration setting unit is configured to set the initial value of the provisional target acceleration to zero in cases where the detector detects the vehicle starts to travel.

3. An apparatus for controlling acceleration of a vehicle, comprising:
    target acceleration calculating means for calculating a target acceleration for the vehicle;
    provisional acceleration setting means for setting a provisional target acceleration such that a change rate of the provisional target acceleration is limited to a target limitation value, the provisional target acceleration being used during a step during which the acceleration of the vehicle is changed to the calculated target acceleration;
    drive power calculating means for calculating a drive power to obtain the provisional target acceleration set by the provisional acceleration setting means; and
    estimating means for estimating an acceleration demanded by a driver in the vehicle,
    wherein the provisional acceleration setting means includes means is configured to set an initial value of the provisional target acceleration depending on either one selected from a vehicle acceleration and the estimated demanded acceleration, the selected acceleration having a difference from the target acceleration, the difference of the selected acceleration being smaller than a difference of the other from the target acceleration, the vehicle acceleration being obtained at a timing when controlling the acceleration is started.

4. A program stored in a memory and configured to be readable by a computer, the computer operating based on the program for an apparatus for controlling acceleration of a vehicle, the program allowing the computer to functionally perform steps of:
    setting a provisional target acceleration such that a change rate of the provisional target acceleration is limited to a target limitation value, the provisional target acceleration being used during a step during which the acceleration of the vehicle is changed to a target acceleration for the vehicle;

calculating a drive power to obtain the provisional target acceleration; and estimating an acceleration demanded by a driver in the vehicle, wherein the setting step sets an initial value of the provisional target acceleration depending on either one selected from a vehicle acceleration and the estimated demanded acceleration, the selected acceleration having a difference from the target acceleration, the difference of the selected acceleration being smaller than a difference of the other from the target acceleration, the vehicle acceleration being obtained at a timing when controlling the acceleration is started.

5. The apparatus of claim 3, comprising a detector that detects that the vehicle starts to travel from a stopped state thereof;

the provisional acceleration setting means is configured to set the initial value of the provisional target acceleration to zero in cases where the detector detects the vehicle starts to travel.

* * * * *